(No Model.)
J. A. PAINE.
STENCH TRAP.
No. 330,148. Patented Nov. 10, 1885.
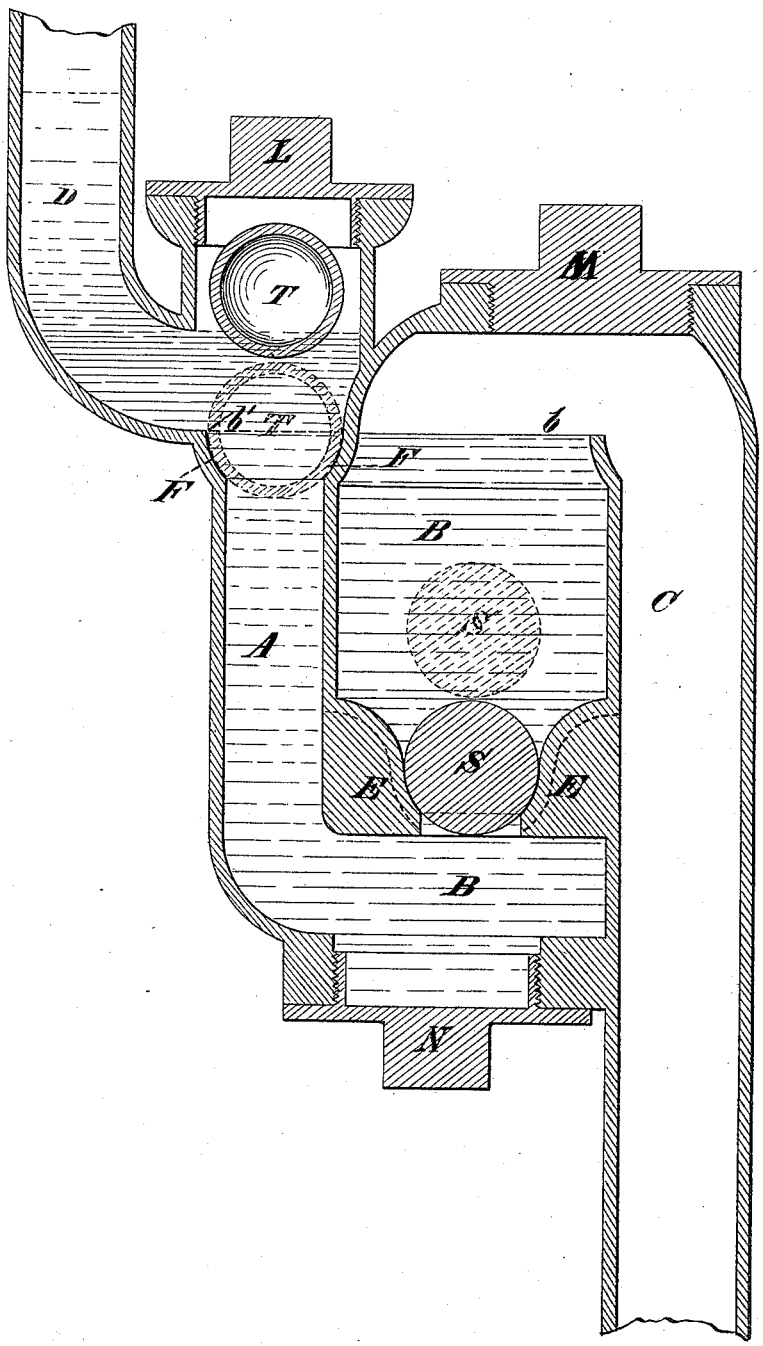
Witnesses
John M. Becker
Francis L. Gross
Inventor
John A. Paine
per S. A. J. Law.
Attorneys.

UNITED STATES PATENT OFFICE.

JOHN A. PAINE, OF TARRYTOWN, NEW YORK.

STENCH-TRAP.

SPECIFICATION forming part of Letters Patent No. 330,148, dated November 10, 1885.

Application filed July 26, 1884. Serial No. 138,914. (No model.)

*To all whom it may concern:*

Be it known that I, JOHN A. PAINE, residing in Tarrytown, in the county of Westchester and State of New York, have invented a new and useful Improvement in Traps for Water-Pipes, of which the following is a full, clear, and exact description, reference being had to the accompanying drawing, making a part of this specification.

My invention is an improvement in the traps used in connection with the pipes from basins, closets, &c., and is intended to produce a trap that will effectually prevent the evaporation of the water therefrom, or the drawing off of the same by suction or siphonic action, and that will also render the passage of sewer-gas through the trap impossible, and is so constructed that the whole interior of the trap can be easily and quickly cleaned.

The accompanying drawing is a vertical sectional view of the trap, showing the position and arrangement of its pipes and valves and the openings into the trap closed by screw-caps, by means of which the pipes may be cleansed and freed from all obstruction.

In the traps commonly used in connection with basins and closets it frequently happens that the sewer-gas, on account of great pressure in the pipes, or for some other cause, overcomes the weight of water in the trap, and is forced through the same and escapes into the house or living-apartments; and it also often occurs that the volume of water in the trap is reduced to such an extent, either by evaporation, when the trap remains unused for a great length of time, or by suction or siphonic action, drawing the water into the sewer-pipes, that it offers but little, if any, resistance to the passage of gas from the sewer-pipes into the rooms.

My improved trap is designed to prevent all such occurrences, and is so constructed that the water in the trap cannot be drawn out of the same by any siphonic action or suction in the pipes, and cannot evaporate, even when the trap remains unused for a long time, and, no matter how great the pressure in the sewer-pipes may be, will not allow the passage of any gas through the trap into the room or other apartment.

The trap constructed according to my improvement consists of the usual U or S shaped tube or pipe connected at one end—its receiving end—with the discharge-pipe from the basin, closet, or other vessel, and by the other end with the pipe into the sewer, and having its bend sufficiently below the water level or mouth of the discharge-pipe to be or constitute a water-reservoir always filled with water, and having its valves so arranged or located that such water space or reservoir will remain continually filled with water, protected against evaporation into the basin, and also against evaporation or suction into the sewer.

As illustrated in the drawing, for economy of space and facility in cleaning the three sections or pipes A, B, and C, forming my improved trap, may be constructed together, or so as to be separated by single walls or partitions.

In the middle section, B, of the trap, which is constructed large enough for the purpose, is placed a spherical valve, S, resting or fitting closely in the valve-seat E E. This valve, which I prefer to make of some hard metal—as copper or brass—is heavier than water, and should be of a weight to slightly exceed the pressure or weight of the water in the other section, A, of the trap, so that when the trap is filled the water will stand a little higher in the section A than in the section B, so as to partially fill the chamber at the top of A, and the valve S, by its weight, will rest closely and tightly on the valve-seat E E. When water enters the trap, the weight of this valve is overcome, and it is forced up from its seat, as shown in dotted lines, so as to allow the extra amount of water to pass through the trap into the discharge or sewer pipe, and is held in this position until water ceases to enter the trap, when it again falls back into its seat and remains there until more water flows into the trap.

The weight of the valve S, which may be made solid or hollow, should be so adjusted that it will move with facility, and not tend in any way to obstruct the flow of water, &c., through the trap. As this valve fits tightly in its valve-seat, it effectually prevents the passage of gas from the sewer-pipes through the trap, and, as will be understood from the drawing, the greater the force or pressure of the gas on the top of the valve the closer it will rest on its seat, and the more effectually it will prevent the escape of gas into the section A of the trap, and thus into the room or apartment. This valve S will also prevent the evaporation of the water from the section A of the trap into the sewer-pipe.

In a chamber situated at the top of section A of the trap, as shown in the drawing, which may be formed in any convenient manner, is another spherical valve, T, made so light as to float on the top of the water in the chamber when the trap is full of water, but at other times resting firmly and tightly in its seat F F. This valve is preferably made hollow, of some hard metal—as copper—by which a tight close connection with the valve-seat is secured, so that no air can pass between the valve and the seat, and yet the necessary lightness and buoyancy are obtained, so that the valve will be lighter than water.

In the ordinary condition of the trap, as already explained, the water partially fills the chamber at the top of the section A of the trap, and the valve T, floating on top of the water, offers no obstruction to the flow into the trap, but is still farther raised away from the valve-seat as the amount of water in the chamber is increased, as will be understood by reference to the drawing; but if, for any reason, the amount of water in the section A of the trap is decreased, the valve T will fall with the column of water until arrested by the valve-seat F F, in which it will remain until again raised and floated by the water in the section A. It follows from this that if, through long disuse of the trap, or for any other reason, the water in the trap evaporates sufficiently to bring the column of water in the section A below the valve-seat F F, the valve T will fall and rest in its seat, and as the valve is so constructed as to fit the valve-seat closely and tightly, further evaporation, and consequently a further decrease of the water in the trap, is prevented. As will thus be seen, evaporation can never decrease the volume of water in the trap below the valve-seat F F, and no matter how long the trap may remain unused, it will always be filled with water up to this point. Moreover, as the weight of the column of water in the section A is lessened, the valve S will rest with greater weight on its valve-seat, and thus compensate for the loss in the volume of water in the trap.

As water enters the trap from the basin or other vessel, the valve T, on account of its lightness, rises from its seat and floats on the column of water, as before.

Should the water in the trap be drawn from the same into the sewer-pipe by any siphonic action or by suction overcoming the weight of the valve S, as the volume of water decreases the valve T would fall until it rested in its valve-seat, and would then arrest any further siphonic action or suction, and would thus prevent any more water being withdrawn from the trap into the sewer-pipe, thus insuring a sufficient quantity of water remaining in the trap to prevent the passage of gas through the same. In my improved trap, therefore, the body of water between the valves S and T is locked in or confined, and cannot be withdrawn from the trap under any circumstances by evaporation or suction, thereby insuring a volume of water in the trap at all times. Thus the combined action of the two valves S and T, embracing a volume of water between them, secures a bar, under all circumstances, against an undesired current up or down and to any emptying of the trap, while at the same time allowing the water to freely pass through the trap.

The valve S may be placed at any point in the section B of the trap as is found desirable, so as to embrace a greater or less volume of water between the valves.

To insure a closer fit of the valves in the valve-seats, the latter may be lined with some hard metal—as brass or copper—and constructed broad enough to allow the valve to have a wide and firm bearing or seat in the same. These valves, instead of being spherical, as shown and described above, may be of any convenient shape, as elongated or oval.

My improved trap is also constructed with openings capable of being closed by screw-caps L, M, and N, as shown in the drawing, by means of which the interior of the trap may be easily and quickly cleaned and freed from all obstructions. The opening in the bottom of the trap, closed by the cap N in the drawing, is so made as to form a pocket or receptacle in which foreign matter may lodge, and from which it may be easily removed. In the trap shown in the drawing the cap M is so placed with respect to the pipe B as to prevent the valve S from passing over into the pipe C; but some other mode of accomplishing this may be employed. My improved trap thus not only prevents sewer-gas from escaping into the room, but also allows the trap to be easily and quickly cleaned and all obstructions to be removed.

What is claimed as new is—

1. In a trap for water-pipes, constructed as described, and having a floating valve with a single valve-seat at the top of the water-chamber, at or near the mouth of the receiving-pipe from the basin, the combination of a second valve and seat, situated at or near the point of discharge into the educt-pipe into the sewer, thereby preventing evaporation into the basin and into the sewer, and the drain of water from the trap by suction or siphonic action into the sewer, and the passage of gas through the trap.

2. In a trap for water-pipes, the combination, with a valve lighter than water, located at the top of the water-chamber, of a valve heavier than water, at or near the entrance to the discharge-pipe into the sewer, whereby the passage of sewer-gas through the trap and the drain of water from the same are rendered impossible, and also evaporation into the basin and into the sewer is prevented.

J. A. PAINE.

Witnesses:
H. W. LINSON,
C. S. DAVISON.